(12) United States Patent
Gaffar

(10) Patent No.: US 11,142,071 B2
(45) Date of Patent: Oct. 12, 2021

(54) SYSTEMS AND METHODS FOR IMPROVED VEHICULAR SAFETY

(71) Applicant: Ashraf Gaffar, Tempe, AZ (US)

(72) Inventor: Ashraf Gaffar, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 174 days.

(21) Appl. No.: 16/577,978

(22) Filed: Sep. 20, 2019

(65) Prior Publication Data

US 2020/0098267 A1    Mar. 26, 2020

Related U.S. Application Data

(60) Provisional application No. 62/733,986, filed on Sep. 20, 2018.

(51) Int. Cl.
| | |
|---|---|
| *G08G 1/16* | (2006.01) |
| *G08G 1/052* | (2006.01) |
| *H04W 4/46* | (2018.01) |
| *B60K 35/00* | (2006.01) |
| *B60K 37/06* | (2006.01) |
| *H04L 12/40* | (2006.01) |

(52) U.S. Cl.
CPC ............ *B60K 35/00* (2013.01); *B60K 37/06* (2013.01); *G08G 1/052* (2013.01); *G08G 1/163* (2013.01); *G08G 1/166* (2013.01); *H04L 12/40019* (2013.01); *H04W 4/46* (2018.02); *B60K 2370/1529* (2019.05); *B60K 2370/785* (2019.05); *H04L 2012/40215* (2013.01); *H04L 2012/40273* (2013.01)

(58) Field of Classification Search
CPC .... B60K 2370/1523; B60K 2370/1529; B60K 2370/785; B60K 35/00; B60K 37/06; G08G 1/052; G08G 1/163; G08G 1/166; H04L 12/40019; H04L 2012/40215; H04L 2012/40273; H04W 4/46
See application file for complete search history.

(56) References Cited

U.S. PATENT DOCUMENTS

| | | | |
|---|---|---|---|
| 5,983,161 A | 11/1999 | Lemelson et al. | |
| 2009/0228172 A1 | 9/2009 | Markyvech et al. | |
| 2017/0374530 A1* | 12/2017 | Ramasamy | ............. G05D 1/02 |
| 2018/0111611 A1* | 4/2018 | MacNeille | ............ B60W 10/20 |
| 2018/0365999 A1* | 12/2018 | Wiklinska | .............. G08G 1/164 |
| 2019/0206258 A1* | 7/2019 | Chang | ................ G01C 21/3664 |

* cited by examiner

*Primary Examiner* — Sisay Yacob
(74) *Attorney, Agent, or Firm* — Polsinelli PC

(57) ABSTRACT

Embodiments of a system for improving automobile safety are disclosed.

7 Claims, 10 Drawing Sheets

202

Situation 1: At-Par Driving

Both A & B are driving on a multi-lane highway or multi-lane road xxx

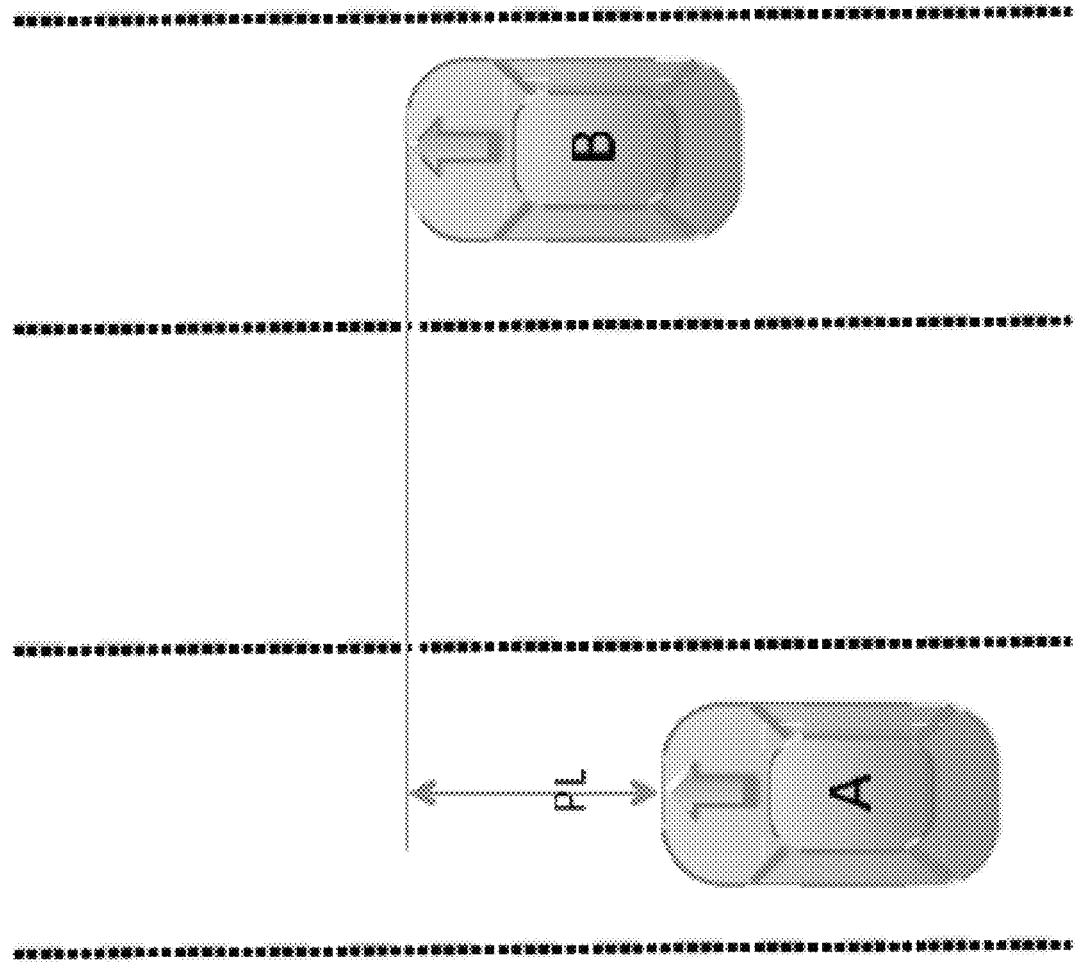

SYSTEMS AND METHODS FOR IMPROVED VEHICULAR SAFETY

CROSS REFERENCE TO RELATED APPLICATIONS

This is a non-provisional application that claims benefit to U.S. provisional patent application Ser. No. 62/733,986 filed on Sep. 20, 2018, which is herein incorporated by reference in its entirety.

FIELD

The present disclosure generally relates to safety systems for vehicles; and more particularly, to a plurality of vehicle safety features including an augmented vehicle-to-vehicle system including functionality and communications for improving vehicular safety systems and reducing driver distraction.

BACKGROUND

Distraction generally can be defined as the ratio between cognitive load exerted by external or internal factors needing attention, and cognitive ability represented by the person's ability to pay attention to and react to events. Driver distraction is a major cause of death in the United States and is the primary cause of fatalities among teenagers. The driving process is inherently distractive, as drivers need to assess the rear and side positions of the vehicle, view gauges and other features of the dashboard, and engage with the gas pedal and brake, all while maintaining attention to the road in front of them. Further, different driving situations impose different levels of cognitive load and hence require different levels of a driver's attention.

However, modern cars are manufactured with a growing number of distracting technologies on board which exacerbates issues related to driver distraction. For example, current infotainment systems and devices and/or in-dash screens, which may be connected to the driver's cell phone, may display a variety of distracting symbols, notifications, or other such graphical software features. In addition, different states have different laws regarding distracted driving (e.g., texting and use of a cell phone while driving), which may be difficult if not impossible to enforce, and interaction with a large digital screen in a vehicle's dashboard (such as an infotainment system) is rarely prohibited or restricted.

It is with these observations in mind, among others, that various aspects of the present disclosure were conceived and developed.

BRIEF DESCRIPTION OF THE DRAWINGS

FIGS. 2A-2B and 3A-3C are images illustrating examples of applications of the V2V vehicular safety system of FIGS. 1A-1B, according to aspects of the present inventive concept.

Corresponding reference characters indicate corresponding elements among the view of the drawings. The headings used in the figures do not limit the scope of the claims.

DETAILED DESCRIPTION

The present disclosure relates to systems and methods for improving vehicular safety. In some embodiments, the present inventive concept may take the form of a computer-implemented vehicle-to-vehicle system which may be deployed for vehicles for and augment car-to-car safety protocols that relate to cooperative driving using virtual barriers to reduce collision potential. The V2V system described herein may form part of an overall intelligent transportation system or be implemented in more specific applications.

Figure 1A:
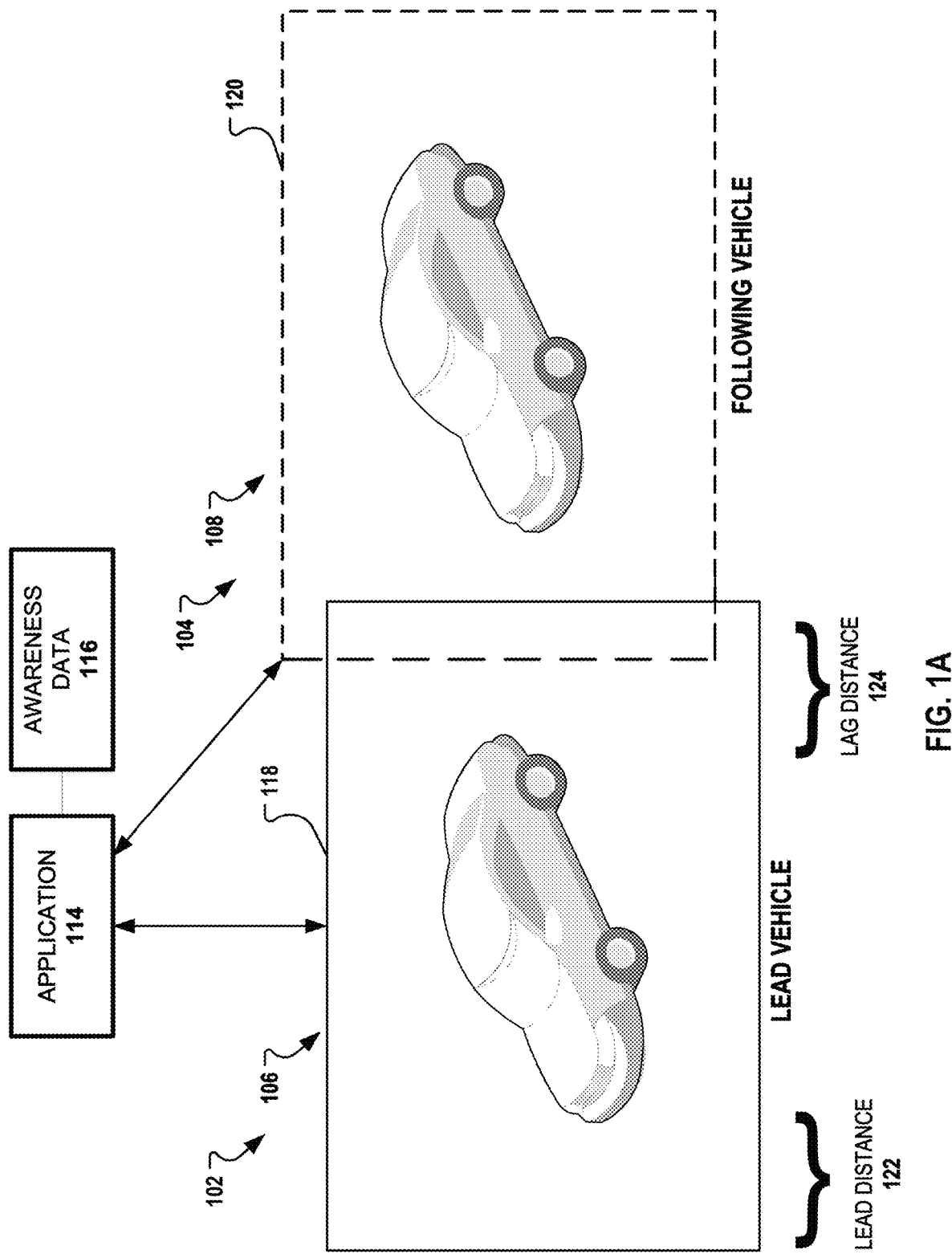
FIG. 1A is a simplified block diagram of an embodiment of a vehicle-to-vehicle (V2V) safety system configured for augmenting V2V communication protocols, according to aspects of the present inventive concept.

Referring to FIG. 1A, a general vehicle-to-vehicle (V2V) safety system, designated system 100, is shown for enhancing communications and associated safety protocols. As described herein, the system 100 improves upon current technology by providing augmented communication protocols to reduce collisions and improve overall safety. By way of some introduction to the technical problems the present concept addresses, many car accidents occur during a lane change or around intersections. V2V communication protocols may allow each car to deter and communicate with surrounding cars. These protocols may involve the use of radar, LIDAR, and different external cameras. However, known V2V protocols and collision systems fail to make precise determinations during a possible collision, and lack features for proactive collision detection at e.g., upcoming intersections.

As a technical solution to the aforementioned technical problems, the present novel concept improves upon V2V protocols and associated components by leveraging the implementation of a virtual barrier around each vehicle, determined by the current state and future intentions of the driver, as further described herein. If the virtual barrier of a first vehicle is determined to overlap with that of a second vehicle, a high potential of collision is deemed to be expected, and the drivers' collision systems may be notified to act further or otherwise resolve the possible collision. In some embodiments, the system 100 may generally include a lead vehicle 102 and a following vehicle 104. The lead vehicle 102 may be equipped with a V2V assembly 106, configured to provide V2V protocols as described herein, which may include a plurality of cameras, radar, LIDAR, and/or other awareness components (not shown). Similarly, the following vehicle 104 may be equipped with a V2V assembly 108, configured to provide V2V protocols, which may include a plurality of cameras, radar, LIDAR, and/or other awareness components (not shown). Each of the vehicles 102 and 104 may have access to or be configured to execute aspects of an application 114. In some embodiments, the application 114 comprises a plug-in, add-on, extension, or update to vehicle operating systems associated with each of the vehicles 102 and 104 and in operable communication with the V2V assembly 106 and V2V assembly 108. In other embodiments, the application 114 may merely be loaded into a memory (158 in FIG. 1B) and may be executed by an ECU or other processing device (e.g., processor 160 of FIG. 1B) of vehicles 102 and 104. The application 114 may further be configured to issue notifications and otherwise interact with the V2V assembly 106 and the V2V assembly 108 to reduce the likelihood of collisions or otherwise enhance safety, as described herein.

The application 114 may be programmed or otherwise configured to access awareness data 116 generated from the V2V assembly 106 and/or the V2V assembly 108. Awareness data 116 may include spatial information about the surroundings of the vehicles 102 and 104 during any given point in time. In particular, the awareness data 116 may indicate whether any objects not affiliated with either vehicle is detected around a predefined three dimensional (3D) perimeter of the vehicle, or virtual barrier. As shown, for example, the application 114 may leverage the awareness data 116 accessed from the V2V assembly 106 to generate a virtual barrier 118 around the vehicle 102, and the application 114 may leverage the awareness data 116 accessed from the V2V assembly 108 to generate a virtual barrier 120 around the vehicle 104. In some embodiments, the virtual barriers 118 and 120 may take into account predetermined distances around the vehicle. As shown for example, the virtual barrier 118 takes into account or otherwise defines a predetermined minimum lead distance 122 between the vehicle 102 and others in front of the vehicle 102 to address possible collisions from the front, and a predetermined minimum lag distance 124 between the vehicle 102 and those behind it to address possible rear-end collisions. As indicated herein, where the virtual barrier 118 and the virtual barrier 120 overlap as shown, the V2V assemblies 106 and 108 associated with the vehicle 102 and the vehicle 104 respectively or other onboard systems may be alerted and notify the driver of an impending collision, or otherwise take reactive measures or issue instructions to microcontrollers associated with e.g., brake subsystems (not shown) of the vehicles 102 and 104.

In some embodiments, the virtual barriers 118 and 120 may vary in size and dimensions based on the speed of each of the vehicle 102 and the vehicle 104. For example, the lead distance 122 may increase with an increase in the speed of the vehicle 102. The lag distance 124 may be determined by the speeds of both the vehicle 102 and the vehicle 104, and may also be dependent upon acceleration and deceleration. In the example of a gradual decrease in speed by the vehicle 102, the lag distance 124 may decrease. However, if the vehicle 102 decelerates at a high rate of speed, the lag distance 124 may increase (and by extension the virtual barrier 118 may be modified) to compensate for the perception and reaction time of a driver associated with the vehicle 104.

The virtual barriers 118 and 120 may also be used to address lane changes, and may accommodate more cooperative safe driving between vehicles. For example, the vehicle 102 may have to increase speed and declare or otherwise communicate to adjacent vehicles proximate to the virtual barrier 118 regarding the anticipated new position of the vehicle 102 after the lane change. If no possible collision between the vehicle 102 or the virtual barrier 118 is detected, the vehicle 102 may "claim" the new location associated with the lane change, and vehicles proximate to the vehicle 102 and/or the new location may be prevented from navigating within the same and/or virtual barriers associated with other vehicles may be prevented from overlapping with the virtual barrier 118 during and after the lane change. This claim to the new location may be temporarily allocated to the vehicle 102 and may expire after a predetermined period of time.

In some embodiments, the functionality provided by the application 114 to enhance V2V as described can be linked to GPS systems (not shown) of different vehicles to extend the communications between vehicles and cooperative navigation described for longer ranges. In one embodiment, where the vehicle 102 approaches a green light, the vehicle 102 may declare a "virtual cell" and claim its intention to pass the intersection in a future time such as within e.g., six seconds. This means that other vehicles may be permitted to occupy the intersection until the vehicle 102 claims the cell.

In some embodiments, overlapping of virtual barriers may also be permitted at different times. If, for example, vehicles are on a collision course and both claim a future cell, they may both be notified and additional attention may be required. If a light turns red and a vehicle is not permitted to cross an intersection, the claim of the primary car may be released by the car or canceled by the traffic light and may be for other vehicle systems to claim. Numerous such features and sub-features are contemplated.

Figure 1B:
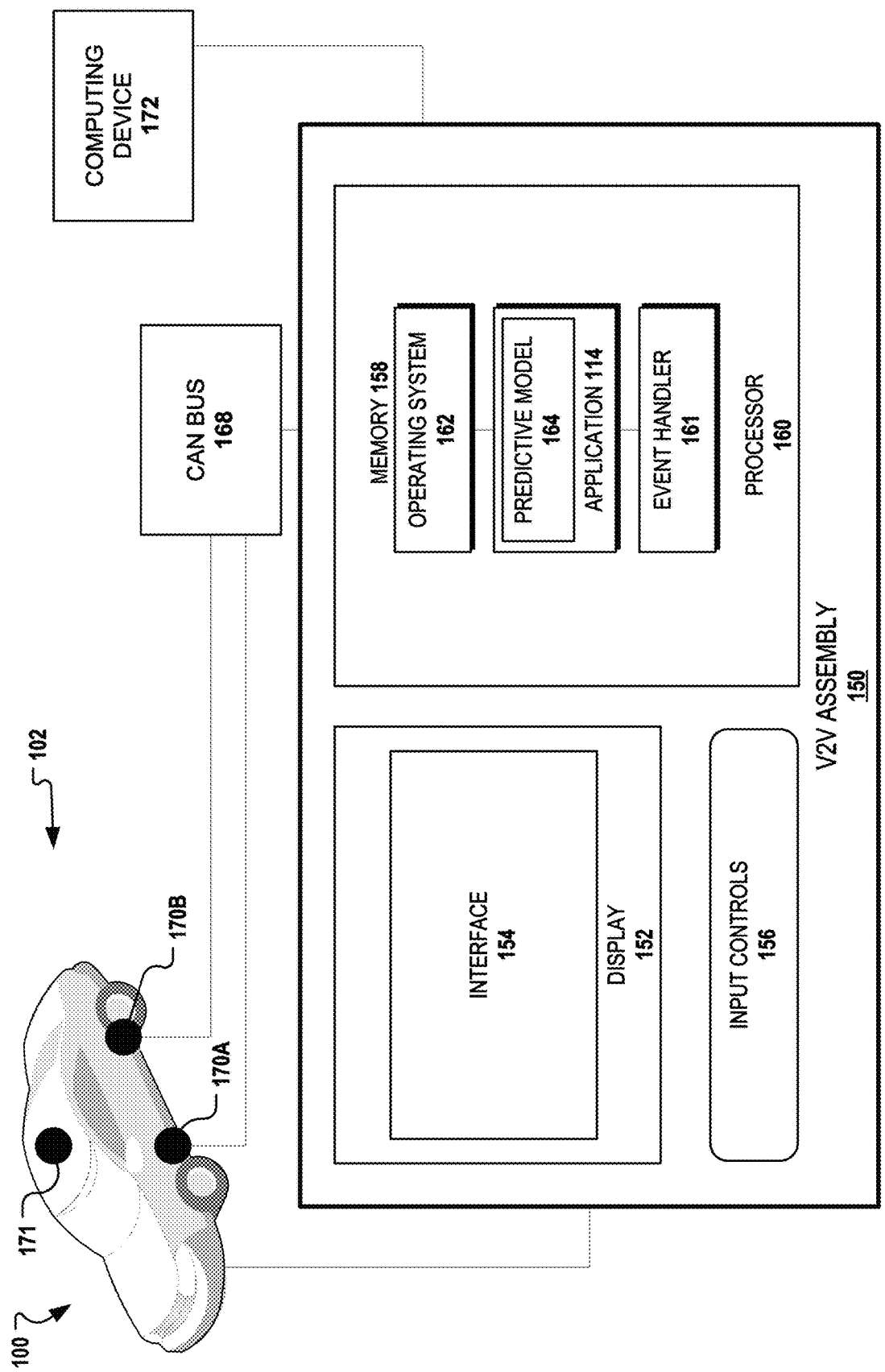
FIG. 1B is a simplified block diagram of a V2V assembly which may be implemented to form aspects of the V2V system of FIG. 1A.

Referring to FIG. 1B, any of the vehicles of the system 100 may include a V2V assembly 150 for implementing the V2V functionality described herein; in other words, the V2V assembly 106 and the V2V assembly 108 may include one or more features of the V2V assembly 150. In the example shown, the V2V assembly 150 is implemented for the vehicle 102. The V2V assembly 150 may define any in-car device or a plurality of devices, such as an infotainment device integrated within the dashboard or otherwise. The V2V assembly 150 may include a collection of hardware and software components providing audio and visual information associated with alerts regarding proximity of other vehicles or objects relative to the vehicle 102, radio, navigation, phone functionality for managing data associated with calls and texts, and the like. In some embodiments, the V2V assembly 150 generally includes a display 152 depicting an interface 154 (such as a graphical user interface) and a driver may interact with the interface 154 using one or more input controls 156 such as dials, keypads, or other such controls or by touching or otherwise engaging the display 152 in the case where the display 152 includes touch-screen technology.

As further shown, the V2V assembly 150 may include or otherwise be in operable communication with a memory 158 or some storage device, (at least one of) a processor 160 or electronic control unit (ECU), storing the application 114, storing an event handler 161 and a vehicle operating system (operating system 162) and defining instructions executable by the processor 160 for managing the V2V assembly 150 including its software and hardware peripherals. In some embodiments, the application 114 may define a predictive model 164 stored in the memory 158 or otherwise executable by the processor 160. In general, the application 114 and the predictive model 164 may be used to generate the virtual barriers and provide various V2V safety functions as further described herein.

In some embodiments, the V2V assembly 150 is in communication with a control area network bus (CAN BUS or any other vehicular data bus) 168 and a plurality of subsystems 170 (designated subsystem 170A and subsystem 170B) defined along the vehicle 102. The CAN BUS 168 allows sensors and microcontrollers of the different subsystems 170A and 170B to communicate with each other, and the subsystems 170 include sensors, microcontrollers, or mechanical components (e.g., brake systems) specific to certain portions or functions of the vehicle 102. The CAN BUS 168 may further communicably couple together one or more electronic control units (ECUs) (not shown) positioned along the vehicle 102 and implemented as part of any of the subsystems 170 or otherwise. For example, the subsystem 170A may be used for the transmission of the vehicle 102, and the subsystem 170B may be used for operations of the doors, and the CAN BUS 168 may accommodate data sharing or interconnection between these subsystems 170 and separate control actuators, or sensors (not shown).

In some embodiments, the V2V assembly 150 is further in operable communication with (and/or comprises) at least one spatial awareness device 171 implemented along the vehicle 102 via any form of a physical (e.g., wired) or wireless communication medium. The spatial awareness device 171 may include any number of type of cameras, radar, LIDAR, and/or other awareness components, and may involve the use of radar, LIDAR, and the like. The V2V assembly 150 allows the vehicle 102 to exchange information about its speed, location, and heading with other vehicles and systems. In some embodiments, the V2V assembly 150 leverages dedicated short-range communications devices using predetermined bandwidths common to other vehicles and external systems as part of an intelligent transportation system.

In some embodiments, leveraging data from the event handler 161 implemented by the processor 160 or one or more ECUs along the vehicle 102, the application 114 described herein may be used to modify the speed, acceleration, or position of the vehicle 102, or provide alerts to the driver or external systems (such as the vehicle 104 or a computing device 172). The application 114 may take the form of a plug-in, add-on, extension, or update to the vehicle operating system 162 to execute the V2V functionality described herein. In other embodiments, the application 114 may merely be loaded into the memory 158 by a wired or wireless connection and may be logically layered over the operating system 162 as a separate application. In these embodiments, the application 114 may issue requests or instructions to the operating system 162. In some embodiments, the application 114 may be programmed in any programming language or programming framework (using e.g., C, C++, Java, Python, Matlab . . . , or the like). The application 114 may be programmed with a specialized class object (not shown) configured to interpret data from the event handler 161 associated with driving conditions and the general position of the vehicle 102 relative to other vehicles and objects or terrain.

Figure 2A:
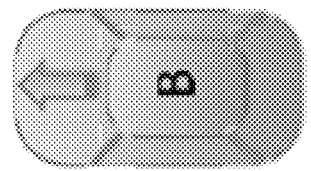
Figure 2A:
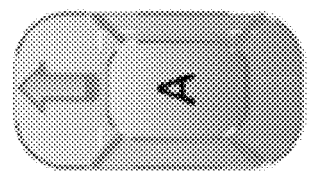
Figure 2B:
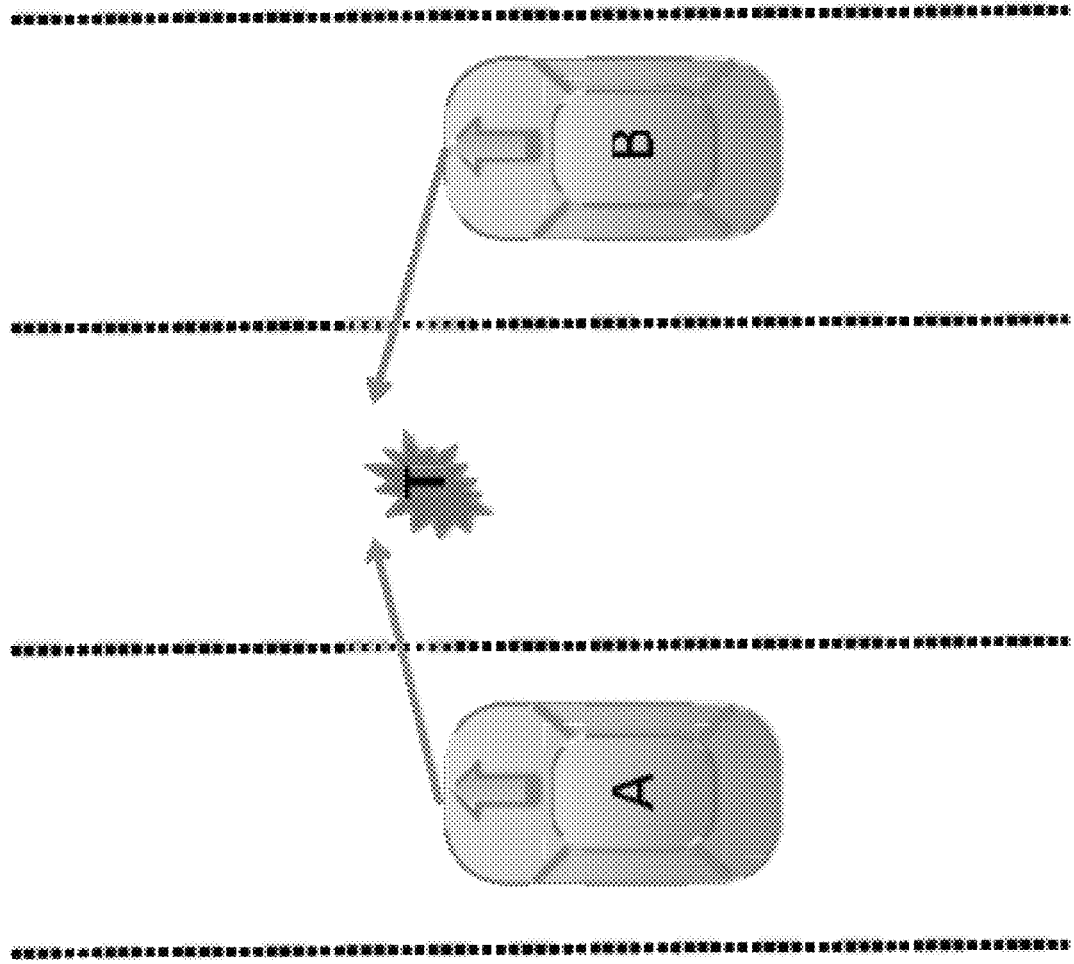

Referring to FIG. 2A, the system 100 may be implemented to address a plurality of possible situations or scenarios and enhance safety protocols. For example, as indicated, the system 100 may be implemented to address a situation 202 involving at-par driving, wherein a vehicle A and a vehicle B are driving along a multi-lane road in parallel as shown. Referring to FIG. 2B, under the scenario 202, a problem 204 may arise where vehicles A and B may attempt to move towards each other or to a same free middle lane between the path of the moving vehicles. As indicated, the drivers of the vehicles may take notice of the impending collision after the collision is already beginning to occur. In some cases, either vehicle may attempt to abort the lane change creating a dangerous situation along the road. The inherent danger in this situation 202 is the symmetry. Both vehicle A and vehicle B may initiate the lane change at or around the same time, and may get too close to each other.

The functionality of the system 100 described herein can reduce the probability of a collision under these conditions of the situation 202 and possibly avoid the problem 204 or other issues. For example, leveraging the V2V assemblies 106 and 108 of FIG. 1A, the vehicle A may generate a virtual barrier (not shown) and the vehicle B may generate its own virtual barrier (not shown), and the vehicles may coordinate and/or cooperate to initiate the lane change safely and orderly. For example, the Vehicle A may leverage an onboard V2V assembly (e.g., V2V assembly 150) to communicate its position and intended target position in the middle lane to the vehicle B.

Referring to FIG. 3A, a delayed position situation 302 is shown where a view of either one of the vehicle A or the vehicle B may occluded, or where the vehicles are in respective "blind zones" or blind spots relative to one another. For example, vehicle A may be slightly behind the lateral position of vehicle B in a passing lane (PL), and both vehicles may be driving on a multi-lane highway or multi-lane road. The driver of vehicle A may see the vehicle B, but the driver of the vehicle B may not see vehicle A because from the perspective of the driver of the vehicle B, the vehicle A may be in a "far blind zone" two lanes away.

Figure 3B:
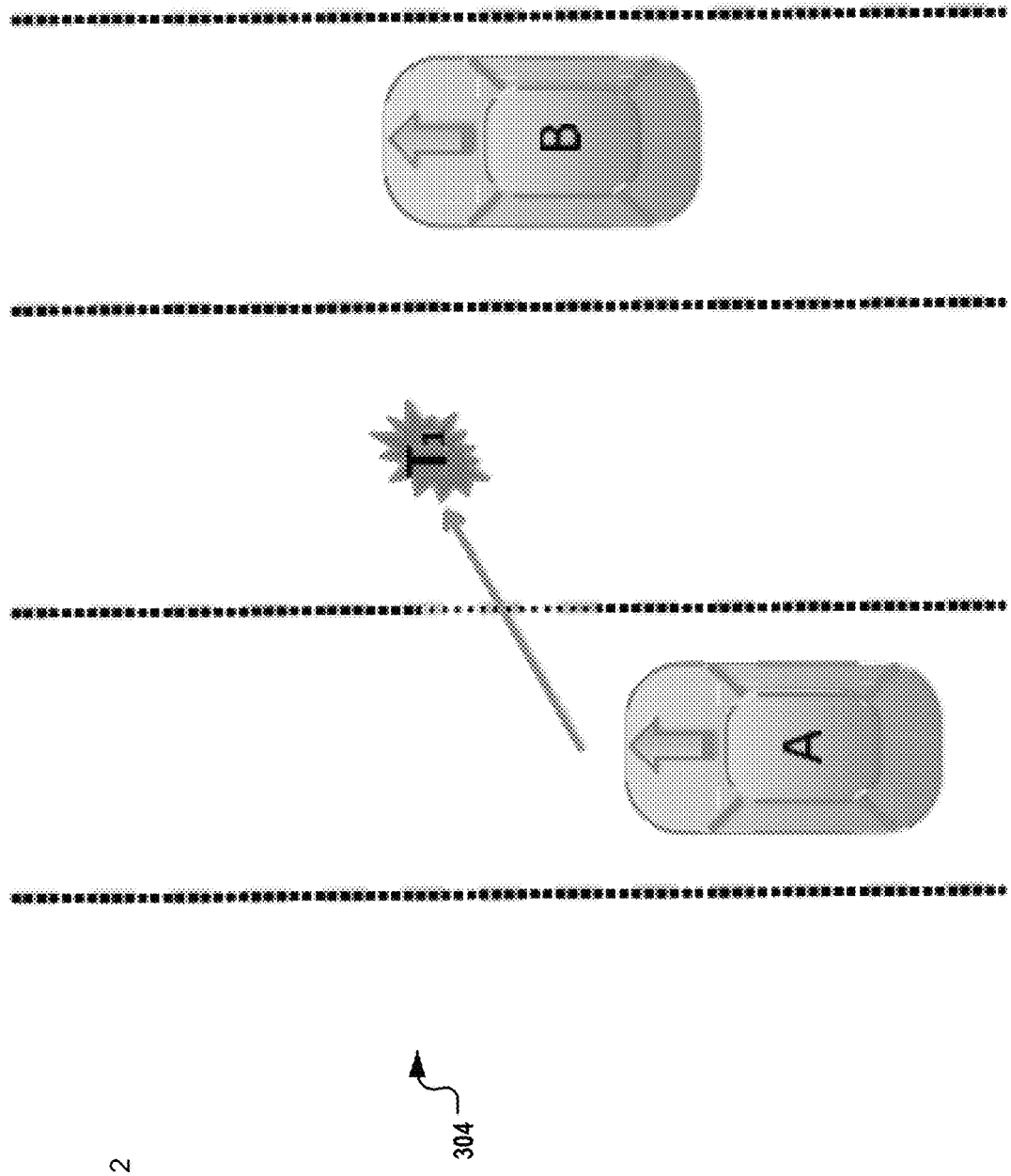

Referring to FIG. 3B, a problem 304 may arise based on the situation 302 where both of the drivers of the vehicles A and B may desire to move to the middle lane. For example, the driver of the vehicle A may see a free position within the middle lane, or target position (T1). The driver of the vehicle A may believe or presume that it is safe to move to the target position T1. Accordingly, the driver of the vehicle A may initiate a lane change to move the vehicle A to the target position T1 within the middle lane as indicated.

Figure 3C:
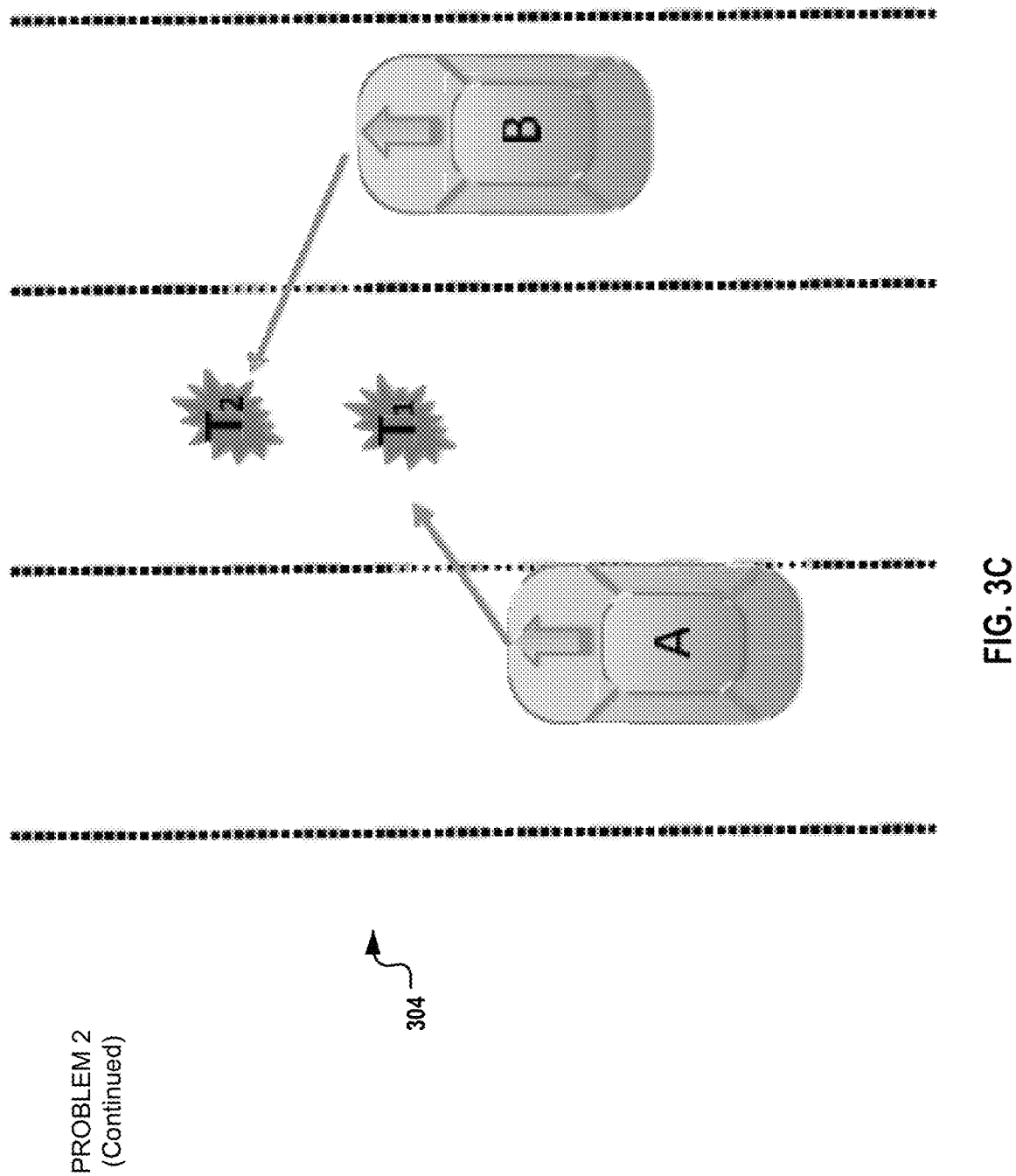

Referring to FIG. 3C, the problem 304 develops where at or around the same time the vehicle A begins to change positions to the target position T1, the driver of the vehicle B also sees a target position T2 (Proximate to or overlapping the target position T1) along the middle lane that the driver of the vehicle B perceives to be a safe target position to navigate the vehicle B. The driver may begin to move the vehicle B to the target position T2, not seeing that the vehicle A is also starting to initiate movement of the vehicle A to the target position T1. Within this problem 304, and depending upon the lateral position difference between vehicles A and B, one of at least three different outcomes may be realized. For example, in one outcome, at least the driver of vehicle A (or B) or both may discover the dangerous situation and abort the change in the position of the vehicle, creating an abrupt and undesired situation along the road. In another possible outcome, both the drivers of the vehicles A and B complete the lane changes such that vehicle A moves to the target position T1 and vehicle B moves to the target position T2. In this outcome, the vehicles may collide or at least move to within a dangerous close proximity. In another possible outcome, an actual accident or collision may definitively occur due to the movement of either of the vehicles A and B in and out of the middle lane.

The inherent danger presented by the situation 302 is its delay. While the driver of the vehicle A may see the vehicle B, the vehicle A may have already initiated movement into the middle lane and is too far long in its transition to abort the lane change. The vehicle B may have initiated movement subsequent to vehicle B, but the vehicle A may be in the blind spot of the driver of vehicle B making the driver less aware as to the possible problem 304. The functionality of the system 100 described herein can reduce the probability of a collision under these conditions. For example, leveraging the V2V assemblies 106 and 108 of FIG. 1A, the vehicle A may generate a virtual barrier (not shown) and the vehicle B may generate its own virtual barrier (not shown), and the vehicles may coordinate and/or cooperate to initiate the lane change to positions T1 and T2 safely and orderly. For example, the Vehicle A may leverage an onboard V2V assembly (e.g., V2V assembly 150) to communicate its position and intended target position T1 in the middle lane to the vehicle B, and the vehicle B may leverage an onboard V2V assembly (e.g., V2V assembly 150) to communicate its position and intended target position T2 in the middle lane to the vehicle A.

Figure 4:
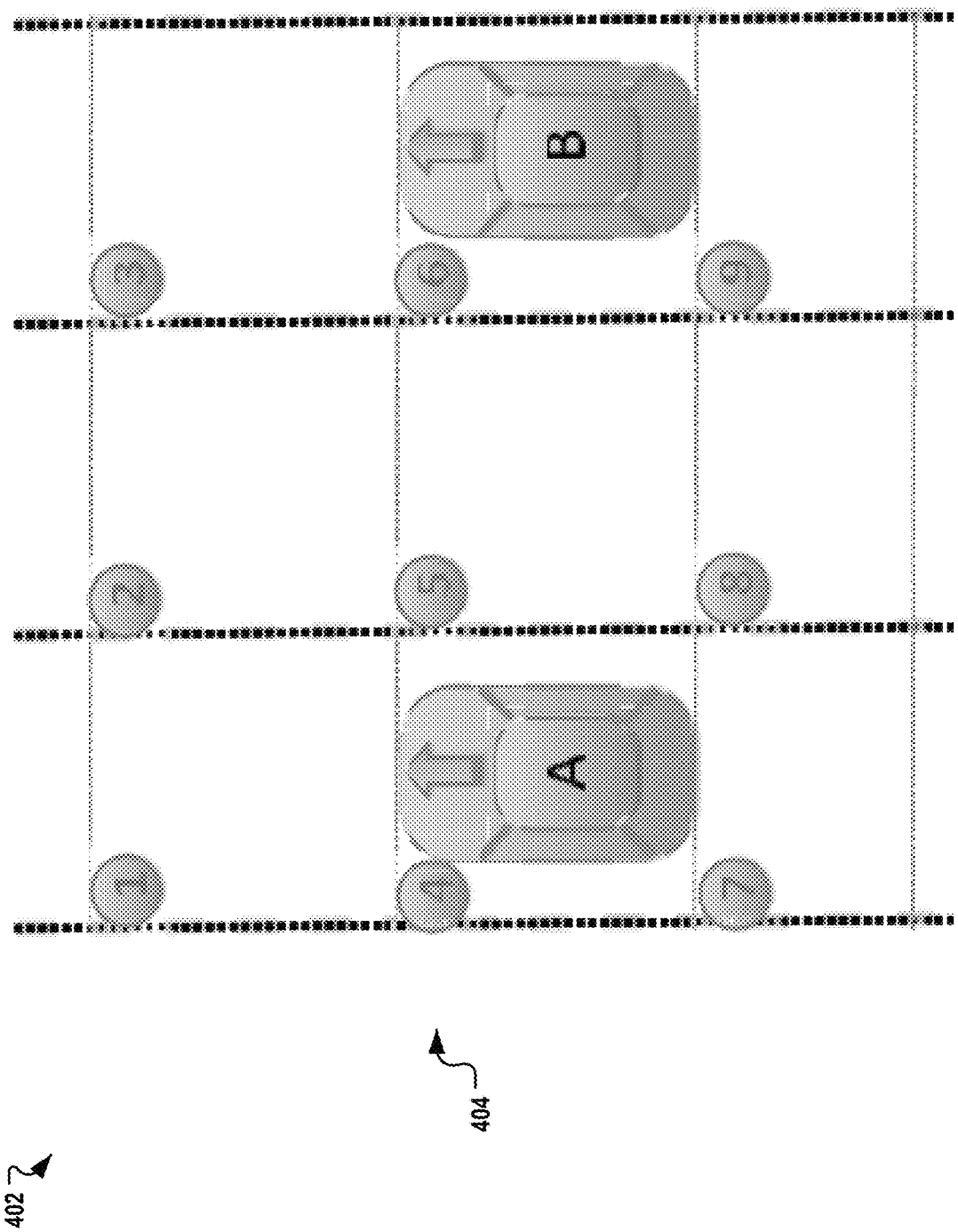
FIG. 4 is a simplified illustration of a collision avoidance grid for enhanced V2V safety protocols as described herein.

Referring to FIG. 4, the system 100 may be implemented as part of a collision avoidance grid 402. In this embodiment, collision avoidance grid 402 defines a plurality of cells 1-9 of a virtual grid 404, defined by or otherwise accessible to the V2V assemblies (not shown) of a vehicle A and a vehicle B. The vehicle A and the vehicle B can occupy a given cell, and navigate to another cell or target cell when it is determined that other vehicles are not already occupying the target cell. For example, both vehicle A and vehicle B may be driving along a multi-lane road. If vehicle A and vehicle B are separate by a middle lane, the driver of the vehicle A and the driver of the vehicle B negotiate respective positions and synchronize using the virtual grid 404 as shown, where cell 1 relates to vehicle A's safety head space, cell 4 relates to vehicle A's current position, cell 7 relates to vehicle A's safety tail space, cell 3 relates to vehicle B's safety head space, cell 6 relates to vehicle B's current position, and cell 9 relates to vehicle B's safety tail space. As shown, cell 2, cell 5, and cell 8 may relate to different positions along the middle lane.

If the driver of the vehicle A desires to move the vehicle A to cell 2 or cell 5, the driver and/or the vehicle A may initiate a "declaration" or intention to so re-position the vehicle A to either of these cells. In other words, either of cells 5 or 2 may be pre-marked as an intended target cell based on the driver of the vehicle A and/or systems associated with the vehicle A. If a similar previous declaration to occupy either of these cells has not yet been identified, the vehicle A may be permitted to move to either of these possible target cells 2 or 5, and other vehicles in a predetermined proximity may be notified. In some embodiments, the driver of the vehicle A may receive a notification that no other vehicles intend to occupy cells 2 or 5 such that the driver can safely navigate the vehicle A to either of these cells. In this manner, the implementation of the virtual grid 404 accommodates a handshake such that vehicles and drivers thereof work collectively to move relative to one another in an orderly safe fashion.

Figure 5:
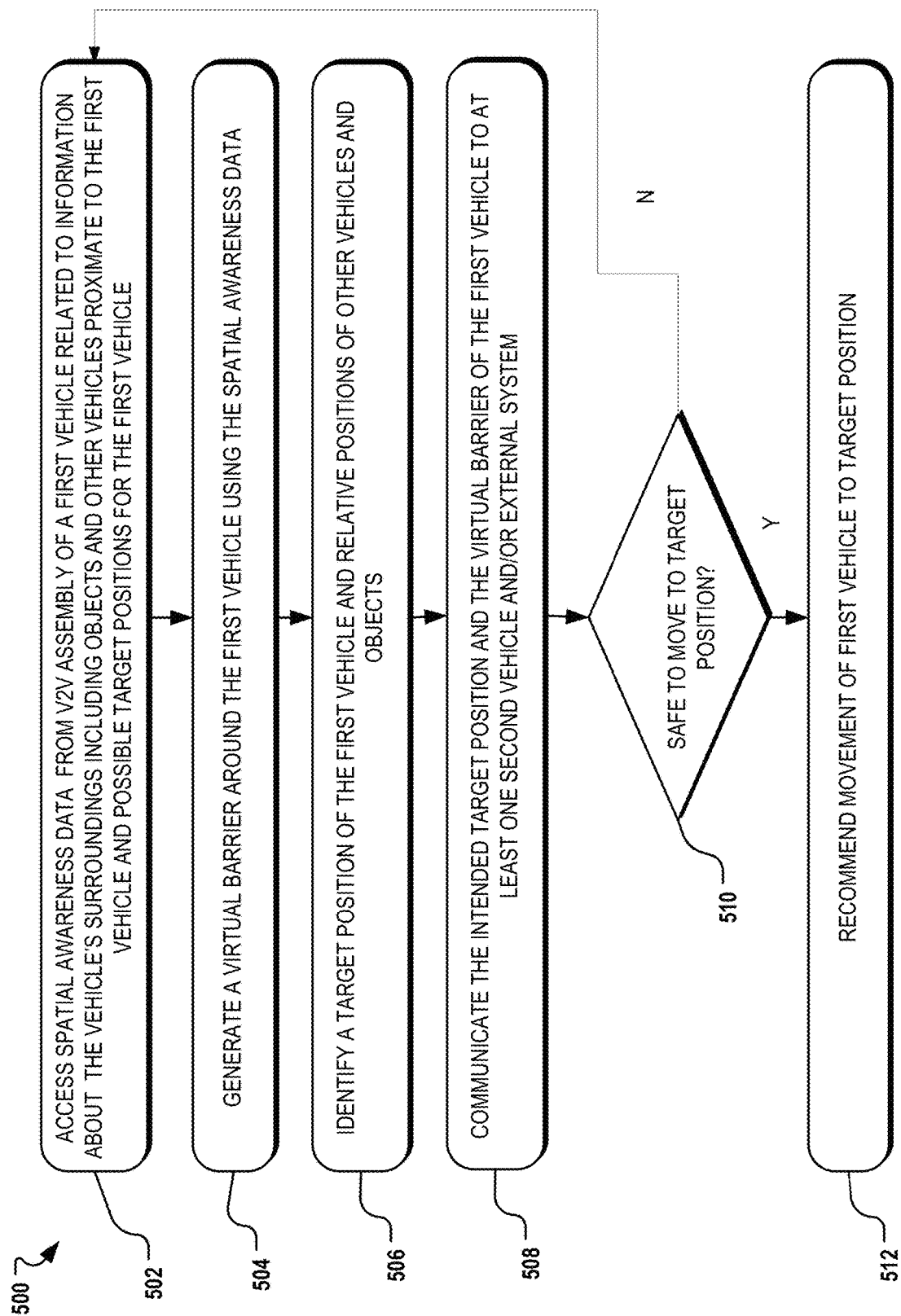
FIG. 5 is a simplified block diagram referencing one possible method for implementing the V2V system described herein.

FIG. 5 is an exemplary process flow 500 illustrating possible steps for implementing the system 100 and applications thereof described herein. Referring to block 502, a first vehicle, such as the vehicle 102 or vehicle A described herein, may access spatial awareness data from a V2V assembly (e.g., V2V assembly 150) to identify the first vehicles position, heading, speed, and acceleration. Referring to block 504, using the spatial awareness data accessed from the V2V assembly of the first vehicle, a virtual barrier, such as the virtual barrier 118, may be generated for the first vehicle defining a predetermined area as described in FIG. 1A. The virtual barrier may then be leveraged to communicate the first vehicle's position, speed, acceleration, and other information to other vehicles and external systems.

The virtual barrier generated may be used to assist the first vehicle with a safe lane change. For example, referring to block 506, a target position may be identified proximate to the first vehicle. In some embodiments, the target position may define a specific position along an adjacent lane on a road that the first vehicle intends to occupy within a predefined period of time. Referencing block 508, in some embodiments, the first vehicle may virtually claim this target position and may communicate the target position to other vehicles.

Referencing decision block 510 and block 512, the virtual barrier and/or the V2V assembly of the first vehicle may be used to determine whether the first vehicle may safely navigate to the intended target position. For example, the virtual barrier, its position, acceleration, and other information may be compared with virtual barriers of vehicles proximate to the first vehicle, such as a second vehicle. If the virtual barrier (and the first vehicle) may safely move to the target position, and the target position is not already claimed or occupied (or may be occupied) by the second vehicle, the V2V assembly may deem the shift of the first vehicle to the target position to be safe, and may communicate this information in the form of a recommendation to the driver of the first vehicle.

Figure 6:
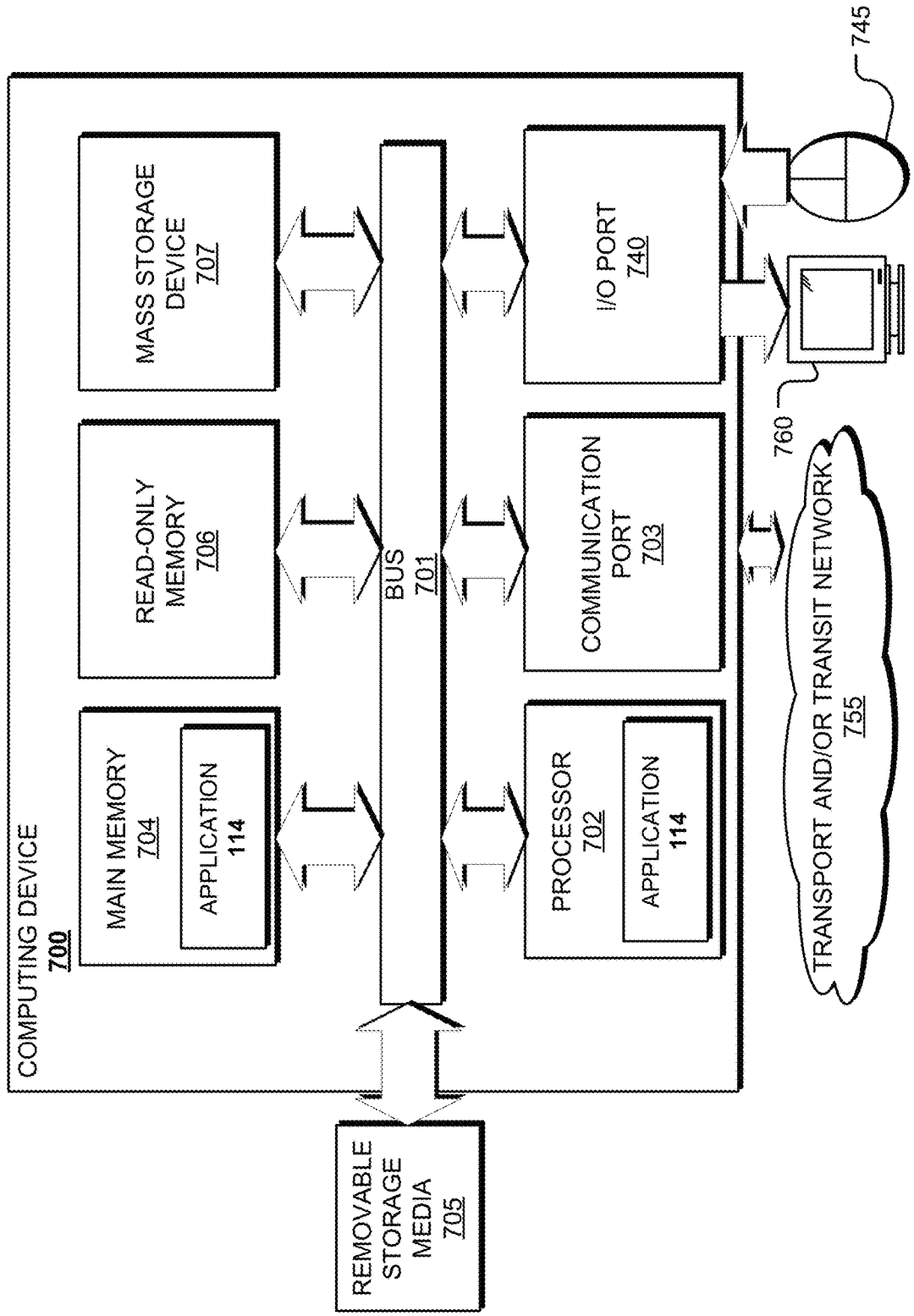
FIG. 6 is a simplified block diagram depicting an exemplary computing device that may implement various services, systems, and methods discussed herein.

FIG. 6 is an example schematic diagram of a computing device 700 that may implement various methodologies discussed herein. For example, the computing device 700 may comprise any number or form of computing device used to execute the application 114 or aspects of the system 100 described herein. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2° processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing device 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/ machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with applications that support functionality as discussed herein. At least a portion of these applications (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and associated software modules stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of forming a vehicle-to-vehicle system for improving automobile safety, comprising:
   providing a V2V assembly associated with a first vehicle;
   generating a first virtual barrier based on spatial awareness data associated with the first vehicle generated from the V2V assembly, the first virtual barrier including a predefined perimeter around the first vehicle;
   identifying a target position of the first vehicle; and
   recommend navigating or not navigating the first vehicle to the target position based on the first virtual barrier.

2. The method of claim 1, further comprising communicating the target position of the first vehicle to a second vehicle.

3. The method of claim 2, further comprising:
   identifying a virtual barrier associated with the second vehicle proximate to the first vehicle; and
   determining whether navigation of the first vehicle to the target position would result in overlap of the first virtual barrier with the second virtual barrier.

4. The method of claim 1, further comprising claiming the target position and communicating the target position as claimed to other devices.

5. The method of claim 1, further comprising:
   accessing a virtual grid including a plurality of cells;
   identifying a given cell of the virtual grid associated with the target position; and
   allocating the given cell to the first vehicle.

6. The method of claim 1, wherein the V2V assembly includes at least one of a camera or LIDAR device positioned along the first vehicle.

7. The method of claim 1, wherein the first virtual barrier defines a lead distance and a lag distance that varies depending upon speed of the first vehicle.

* * * * *